(12) United States Patent
Mohammad

(10) Patent No.: US 8,179,545 B2
(45) Date of Patent: May 15, 2012

(54) ADAPTIVE CONFIGURATION OF IMAGING DEVICES

(75) Inventor: Soiba Mohammad, Sunnyvale, CA (US)

(73) Assignee: Ricoh Company, Ltd., Tokyo (JP)

(*) Notice: Subject to any disclaimer, the term of this patent is extended or adjusted under 35 U.S.C. 154(b) by 1042 days.

(21) Appl. No.: 11/350,968

(22) Filed: Feb. 8, 2006

(65) Prior Publication Data

US 2007/0182987 A1    Aug. 9, 2007

(51) Int. Cl.
*G06F 3/12* (2006.01)
(52) U.S. Cl. .......................... 358/1.15; 358/1.1; 358/1.9
(58) Field of Classification Search ........... 358/1.1–1.16
See application file for complete search history.

(56) References Cited

U.S. PATENT DOCUMENTS

| 7,190,467 | B2* | 3/2007 | Simpson et al. | 358/1.1 |
| 2001/0035972 | A1 | 11/2001 | Wurmfeld | |
| 2002/0048036 | A1* | 4/2002 | Nakagawa et al. | 358/1.14 |
| 2004/0186925 | A1* | 9/2004 | Cooper et al. | 710/8 |
| 2005/0235051 | A1* | 10/2005 | Brown et al. | 709/220 |

FOREIGN PATENT DOCUMENTS

| EP | 1229724 A2 | 8/2002 |
| GB | 2271208 A | 4/1994 |
| JP | 2000235466 A | 8/2000 |
| JP | 2004062253 A | 2/2004 |

OTHER PUBLICATIONS

European Patent Office, "European Search Report", EP application No. EP 07250305, dated Mar. 1, 2010, 8 pages.

* cited by examiner

*Primary Examiner* — Benny Tieu
*Assistant Examiner* — Michael Tzeng
(74) *Attorney, Agent, or Firm* — Hickman Palermo Truong & Becker LLP; Edward A. Becker

(57) ABSTRACT

A method and apparatus for configuring an imaging device is provided. A first imaging device may monitor communications exchanged between clients and imaging devices over a network to identify requests to process electronic documents. In response to the first imaging device either detecting a particular request, to process an electronic document, issued to a different imaging device than the first imaging device or receiving at the first imaging device the particular request to process the electronic document, the first imaging device may update its own current configuration for processing electronic documents. For example, an imaging device may update its own current configuration to reflect the most popular way in which electronic documents have been processed by imaging devices on the network.

30 Claims, 5 Drawing Sheets

ADAPTIVE CONFIGURATION OF IMAGING DEVICES

FIELD OF THE INVENTION

The present invention relates to configuring imaging devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An imaging device is a device capable of processing an electronic document. For example, an imaging device may generate an electronic version of a printed document or generate a printed version of an electronic document. For example, a scanner and a printer are each examples of an imaging device.

Imaging devices typically support a variety of features. For example, the types of features that a printer may support include stapling a document after printing, printing on both sides of a page, and printing documents on paper of various sizes.

When a user uses an imaging device, typically a user is presented with a current configuration for the features supported by the imaging device. Thereafter, the user may customize the current configuration to create a customized configuration for a specific use of the imaging device. For example, in response to issuing a print request to a printer, the user may be presented an interface that displays a current configuration for the printer. The user may use the interface to either accept the current configuration, or specify a customized configuration for the printer.

Unfortunately, the current configuration of an imaging device is usually established at the time the imaging device is first deployed on a network. As a result, the current configuration of an imaging device may not reflect how users are actually using the imaging device. Thus, each time a user employs the imaging device, that user must spend time creating a customized configuration for a particular use. The more a customized configuration deviates from the current configuration, the more time and effort is required on behalf of the user to create the customized configuration.

In certain imaging devices, an administrator may update the current configuration of the imaging device after the imaging device has been deployed. However, this places an undue burden on the administrator, as the administrator must determine the composition of a revised configuration of the imaging device, and make an effort to update the current configuration of the imaging device to reflect the revised configuration. Consequently, an improved approach for updating the configuration of an imaging device, which avoids the disadvantages of prior approaches, is desirable.

SUMMARY

Techniques are provided for configuring an imaging device. Embodiments of the invention operate under the observation that the current configuration of imaging devices may be updated based, at least in part, on how imaging devices are actually processing electronic documents. For example, a first imaging device may monitor communications exchanged between clients and imaging devices over a network to identify requests to process electronic documents. In response to the first imaging device detecting a particular request to process an electronic document, issued by a client to either the first imaging device or to a different imaging device than the first imaging device, the first imaging device may update its own current configuration for processing electronic documents to reflect the request to process the electronic document. In this way, the current configuration of an imaging device may dynamically adapt to reflect requests to process electronic documents either directed to itself or to other imaging devices.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the present invention described herein. It will be apparent, however, that the embodiments of the present invention described herein may be practiced without these specific details. In other instances, well-known structures and devices are shown in block diagram form in order to avoid unnecessarily obscuring the embodiments of the present invention described herein.

Functional Overview

Embodiments of the invention advantageously provide for configuring an imaging device. According to an embodiment, a current configuration of a particular imaging device is updated to reflect how an imaging device, such as the particular imaging device or a different imaging device, have processed electronic documents. In this way, an administrator need not manually update the current configuration of an imaging device, as the current configuration of the imaging device may be dynamically adapted to reflect how imaging devices are processing electronic documents. For example, the current configuration of the imaging device may be dynamically updated to reflect the most popular way in which electronic documents have been processed by imaging devices on a network.

Figure 1:
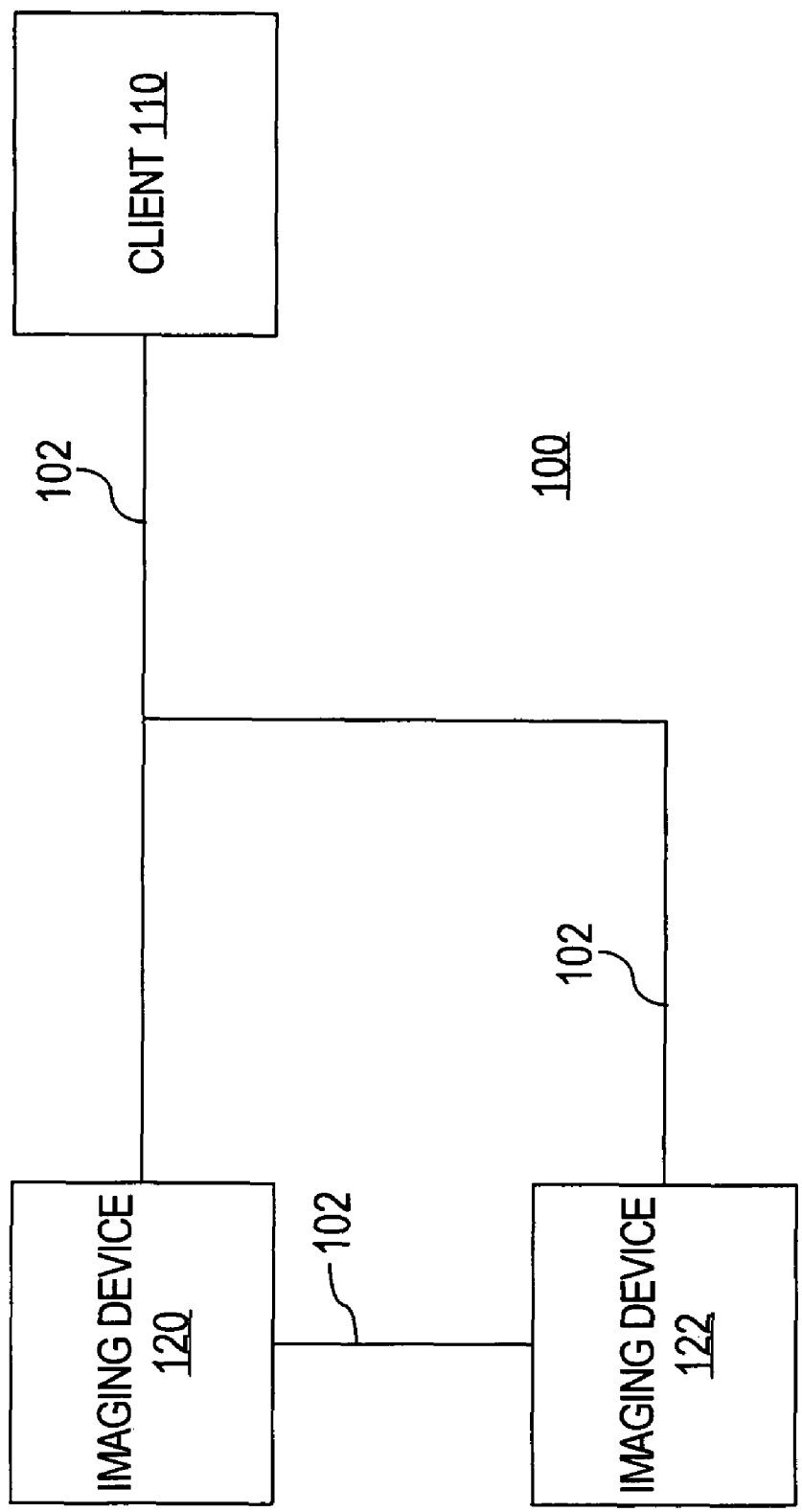
FIG. 1 is a block diagram of a system according to an embodiment of the invention.

FIG. 1 is a block diagram of a system 100 according to an embodiment of the invention. According to the embodiment of FIG. 1, client 110 may issue an "imaging device information request" to imaging device 120 over network 102. An imaging device information request is a request, which is issued by a client to an imaging device, for (a) information about the features supported by the imaging device, and (b) information about the current configuration of the imaging device.

In an embodiment, the imaging device information request may conform to the Web Services protocol. The Web Services protocol is a public protocol made available and supported by the World Wide Web Consortium (W3C). The Web Services protocol is designed to support interoperable machine-to-machine interaction. In other embodiments, the imaging device information request may not conform to the Web Services protocol, but may conform to another protocol for supporting machine-to-machine interaction.

In response to client 110 issuing an imaging device information request to imaging device 120, imaging device 120 will respond by sending an "imaging device information response" to client 110 over network 102. An imaging device information response is a response, issued by an imaging device to a client, that identifies (a) the features supported by the imaging device, and (b) the current configuration of the imaging device. Imaging device 120 may send the imaging device information response to client 110 using a protocol which client 110 understands, e.g., imaging device 120 may send the imaging device information response to client 110 using the same protocol as client 110 used to send the imaging device information request to imaging device 120.

After receiving the imaging device information response, client 110 may issue a request ("a process request"), to process an electronic document, to imaging device 120 over network 102. For example, the process request may be a request to print an electronic document. The process request identifies the electronic document that the imaging device is to process. The process request may also identify custom job data. Custom job data is data that identifies how to process the electronic document identified by the process request.

In an embodiment, custom job data identifies all the features which imaging device 120 should use in processing the request. In other embodiment, the custom job data only identifies those features, which imaging device 120 should use to process the request, that conflict with the current configuration of imaging device 120. To illustrate such an embodiment, assume that the current configuration of imaging device 120 is:

feature A=YES
feature B=NO
feature C=5

If a process request is received by imaging device 120, and the custom job data contained therein indicates that the electronic document is to be processed by imaging device 120 according to the following configured features:

feature B=YES
feature C=10, then the request will be processed by imaging device 120 using feature A=YES, feature B=YES, and feature C=10. Imaging device 120 will process the electronic document using feature A because feature A is included in the current configuration of imaging device 120, and the custom job data does not contradict the use of that feature.

According to an embodiment of the invention, imaging device 122 may monitor communications exchanged between clients and imaging devices over network 102 to identify process requests. For example, if a process request is sent from client 110 to imaging device 120, and the process request is sent using the Web Services protocol, then imaging device 122 may detect the process request sent from client 110 to imaging device 120 using the Web Services protocol. Use of the Web Services protocol is optional, as other protocols may be used by imaging device 122 to monitor communications.

Alternately, imaging device 122 may monitor communications exchanged between clients and imaging devices over network 102 by issuing a request, to imaging device 120, to retrieve information about the current configuration of imaging device 120. Imaging device 122 may update its own configuration based on the information retrieved from imaging device 120. In this way, each imaging device may dynamically update its own configuration based on (a) process requests received at the imaging device, and (b) information about the current configuration of another imaging device that is periodically retrieved. Such an embodiment may be useful if client 110 issues process requests to imaging device 120 in a manner which imaging device 122 cannot directly observe, e.g., a security feature supported by a transmission protocol (such as IPV6) may be used in sending process requests which may prevent the process requests from being directly observed by imaging device 122. Other approaches for monitoring communications in environments where imaging devices cannot directly observe exchanged communications are discussed below.

In response to imaging device 122 detecting a particular issued process request, imaging device 122 may update its current configuration. For example, imaging device 122 may determine that most process requests issued in network 102 contain custom job data that indicates that electronic documents should be processed using feature C with a value of 10. As a result, imaging device 122 may update its current configuration so that the current configuration of imaging device 122 indicates that feature C has a value of 10. In this way, an imaging device in system 100 may update its own current configuration to reflect the activity of the network to which the imaging device is coupled.

Having described a high level functional overview of an embodiment of the invention, further description about the architecture of an embodiment will be discussed.

Architecture Overview

The system 100 depicted in FIG. 1 represents an illustrative embodiment. Only two imaging devices and one client are depicted in system 100 for purposes of providing a clear example; however, embodiments of the invention may include any number of imaging devices and any number of clients.

In an embodiment, system 100 includes a network 102, client 110, and imaging devices 120 and 122. Network 102 may be implemented by any medium or mechanism that provides for the exchange of data between client 110 and imaging devices 120 and 122. Examples of network 102 include, without limitation, a network such as a Local Area Network (LAN), Wide Area Network (WAN), Ethernet and the Internet. Network 102 may be implemented using one or more terrestrial, satellite, wired, or wireless links.

Client 110 may be implemented by any medium or mechanism that provides for communicating with an imaging device. For example, a user may use client 110 to issue a process request or an imaging device information request to an imaging device. Examples of client 110 include, without limitation, a software application, a node on a network, a wireless device, a cell phone, and a portable digital assistance (PDA).

Imaging devices 120 and 122 may be implemented by any medium or mechanism that provides for processing an electronic document. For example, an imaging device may generate an electronic version of a printed document or generate a printed version of an electronic document. For example, a scanner, a copier, a facsimile, a printer, and a multi-function peripheral (MFP) are each examples of an imaging device.

Figure 2:
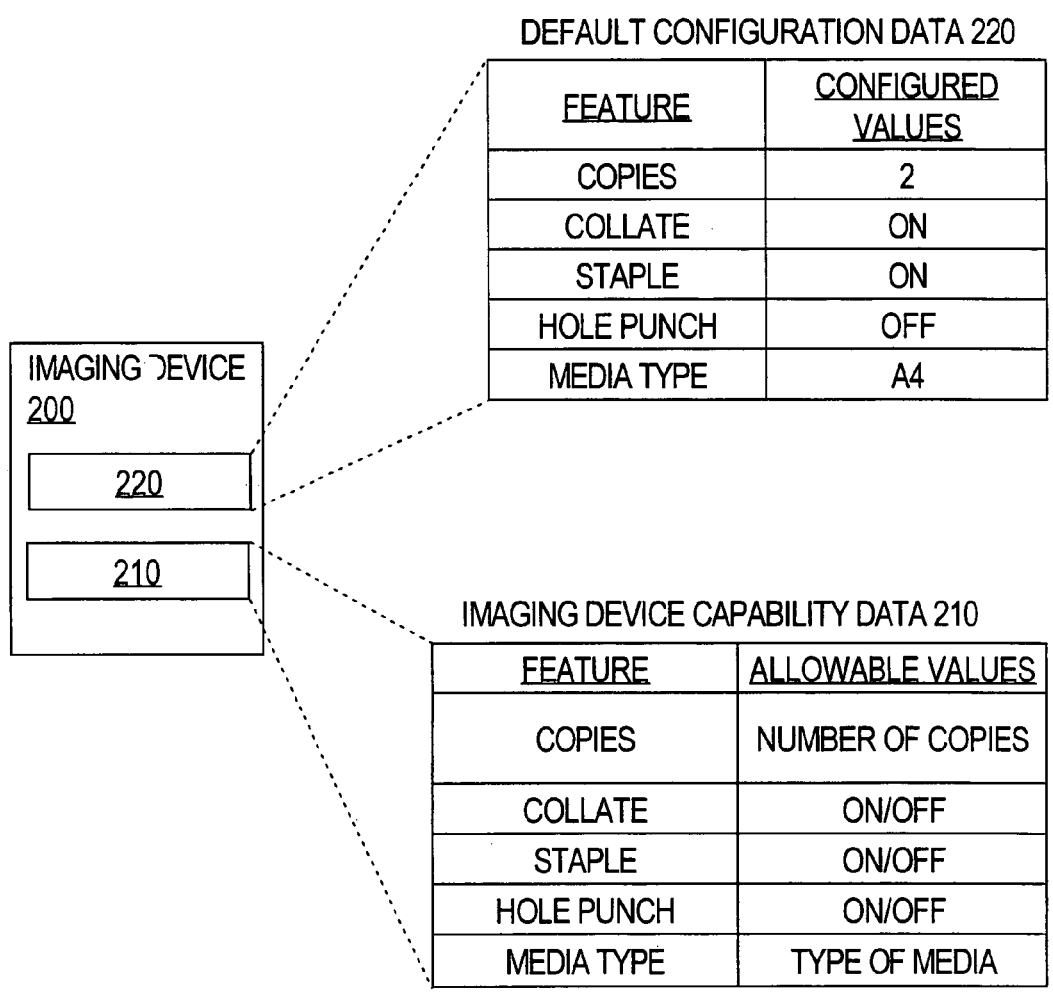
FIG. 2 is a block diagram of an imaging device according to an embodiment of the invention.

FIG. 2 is a block diagram of an imaging device according to an embodiment of the invention. For example, imaging device 200 of FIG. 2 may represent either imaging device 120 or imaging device 122 of FIG. 1. As shown in FIG. 2, imaging device 200 stores imaging device capability data 210 and current configuration data 220. Imaging device capability data 210 is data that identifies all the features supported by imaging device 200. For example, as shown in FIG. 2, imaging device 200 is a printer, and imaging device capability data 210 identifies that imaging device 200 supports features such as (a) printing any number of copies, (b) collating, (c) stapling, (d) hole punching, and (e) printing to different types of media.

Each feature supported by imaging device 200 may be associated with one or more allowable values that correspond to how the feature may be implemented. For example, the allowable values associated with the collate feature identify that the collate feature may be turned on or off, and the allowable values associated with the copies feature indicate a number of copies to be printed. The specific features identified in the imaging device capability data 210 that are shown in FIG. 2 are merely illustrative, as imaging device capability data 210 may identify any feature that imaging device 200 supports.

Current configuration data 220 is data that identifies the current configuration of imaging device 200. The current configuration of imaging device 200 identifies how, in absence of contrary instructions, imaging device 200 will process an electronic document. Current configuration data 220 may include, for each feature identified by the current configuration data 220, a configured value for that feature. Thus, according to the example depicted in FIG. 2, by current imaging device 200 will print documents using the collate feature, the staple feature, and will print 2 copies of the electronic document on A4 paper. The specific features and configured values identified in the current configuration data 220, shown in FIG. 2 are merely illustrative, as current configuration data 220 may identify any current configuration of imaging device 200.

Having described an illustrative architecture of an embodiment of the invention, an explanation of configuring an imaging device according to an embodiment of the invention shall now be described.

Configuring a Device

Figure 3:
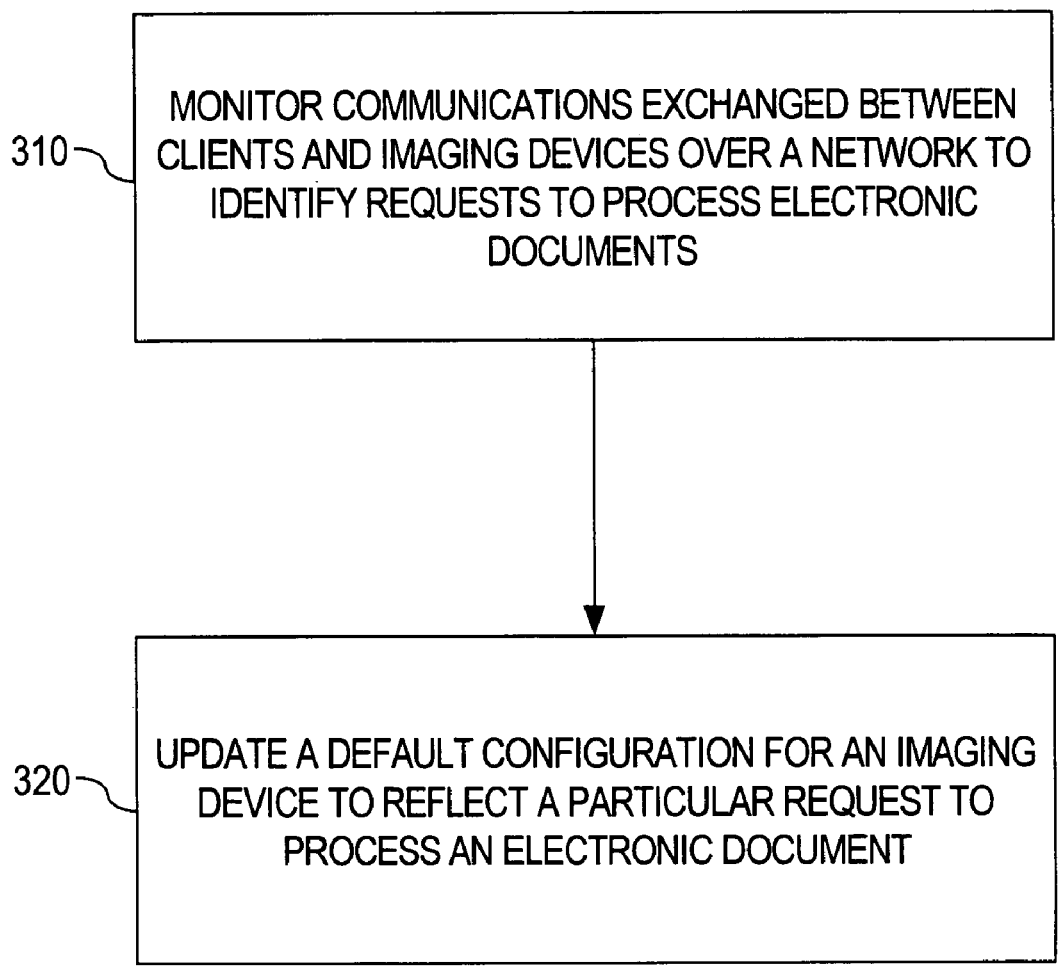
FIG. 3 is a flowchart illustrating the functional steps according to an embodiment of the invention.

FIG. 3 is a flowchart illustrating the functional steps according to an embodiment of the invention. The functional steps of FIG. 3 shall be explained below with reference to FIGS. 1 and 2. While the functional steps of FIG. 3 are graphically portrayed in FIG. 3 as following a linear progression, embodiments may perform the steps of FIG. 3 in a different order than graphically portrayed in FIG. 3, e.g., the step of FIG. 3 may be performed in parallel.

For purposes of providing a clear example, the steps of FIG. 3 shall be explained below from the perspective of imaging device 122 of FIG. 1 performing the steps of FIG. 3. However, in an embodiment of the invention, two or more imaging devices in system 100 may simultaneously perform the steps of FIG. 3.

In step 310, imaging device 122 monitors communications exchanged between clients and imaging devices over network 102 to identify process requests. The purpose of step 310 is for imaging device 122 to identify process requests sent over network 102, and once identified, imaging device 122 retrieves custom job data from the identified process request.

In an embodiment, imaging device 122 may perform step 310 by receiving a process request sent from client 110 to imaging device 122 over network 102.

In an embodiment, imaging device 122 may perform step 310 by detecting process requests sent from client 110 to other imaging devices over network 102. To illustrate, imaging device 122 may be configured to detect communications, exchanged by clients and imaging devices over network 102, which conform to the Web Services protocol. Techniques for detecting communications that conform to the Web Services protocol are well known to those in the art, and are provided by the Web Services protocol, available from the W3C.

In an embodiment where imaging device 122 is configured to detect communications, exchanged over network 102, which conform to the Web Services protocol, imaging device 122 may listen on network 102 to detect a PrintTicket. A PrintTicket is a data structure, specified by the Web Services protocol, for storing custom job data. Once a particular PrintTicket is detected, imaging device 122 extracts the custom job data from the PrintTicket.

In other embodiments, imaging device 122 is not configured to detect communications, exchanged over network 102, which conform to the Web Services protocol, but instead, is configured to detect communications, exchanged over network 102, which conform to another protocol that supports interoperable machine-to-machine interaction. In such an embodiment, imaging device 122 may listen on network 102 to detect a data structure, specified by that protocol, for storing custom job data. Once the particular data structure containing the custom job data is detected, imaging device 122 extracts the custom job data from the data structure. As a result, embodiments of the invention need not employ the Web Services protocol, but may use other protocols available now or developed in the future that support machine-to-machine interaction.

In an embodiment, imaging device 122 may store data that identifies a set of identified imaging devices on network 102. For example, imaging device 122 may store a set of network address (e.g., IP address) for the set of identified imaging devices on network 102. When a process request is detected by imaging device 122 in step 310, imaging device 122 may determine if the imaging device, to which the process request is directed, is a member of the set of identified imaging devices. If the detected process request is directed to a member of the set of identified imaging devices, then imaging device 122 may proceed to retrieve the custom job data from the process request. However, if the detected process request is not directed to a member of the set of identified imaging devices, then imaging device 122 may ignore the process request. In this way, imaging device 122 may restrict which process requests may be used as a basis for updating the current configuration of imaging device 122.

For example, it may be desirable to only update the current configuration of imaging device 122 based on the activity of imaging devices that are in close physical proximity to imaging device 122. This is so because imaging devices that are not in close physical proximity to imaging device 122 may be used by different users or for different uses than imaging device 122. As a result, in such an embodiment, imaging device 122 may store data that identifies a set of identified imaging devices that are in close physical proximity to imaging device 122, so that only process requests directed towards imaging devices in the set of identified images devices are processed by imaging device 122 to extract the custom job data.

In this embodiment, other criteria may be used as a basis for determining the composition of the set of identified imaging devices other than the physical proximity of the identified imaging devices to imaging device 122. The composition of the set of identified imaging devices may be based on a certain characteristic that each imaging device in the set of identified imaging devices shares with imaging device 122. For example, the characteristic shared by each of the set of identified imaging devices and imaging device 122 may be (a) a portion of a company or organization to which each imaging device is associated or (b) an intended use associated with each imaging device.

After a particular process request has been detected, and custom job data has been retrieved from the particular process request by imaging device 122, processing proceeds to step 320.

In step 320, imaging device 122 updates its current configuration to reflect a detected process request. For example, in an embodiment, imaging device 122 updates current configuration data 220, maintained by imaging device 122, to reflect the custom job data retrieved from the detected process request. As explained in further detail below, current configuration data 220 need not be updated with each process request received or identified by imaging device 122; instead, imaging device 122 may wait to update current configuration data 220 until a condition is satisfied, e.g., a certain amount of time has expired or a certain number of process requests have either been received or identified.

Figure 4:
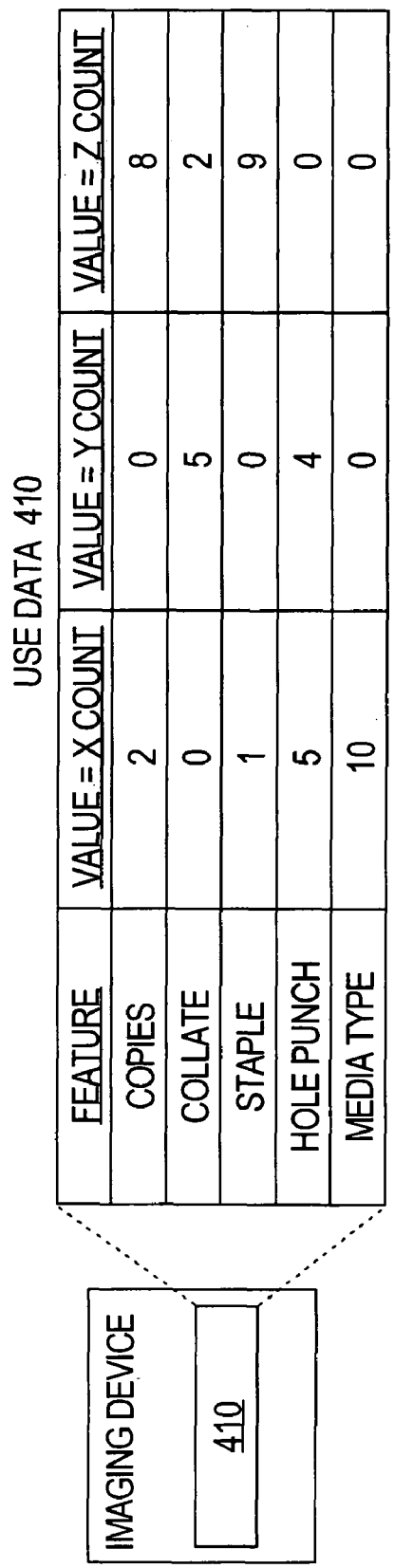
FIG. 4 is an illustration of use data according to an embodiment of the invention.

In an embodiment, imaging device 122 updates current configuring data 220 to reflect the detected process request using use data. FIG. 4 is an illustration of use data 410 according to an embodiment of the invention. Use data 410 is data, maintained by an imaging device, which indicates how electronic documents have been processed by imaging devices. Each time imaging device 122 receives custom job data from a detected process request in step 310, imaging device 122 updates use data 410 maintained by imaging device 122. In an embodiment, imaging device 122 may also update use data 410 to reflect any process requests sent by clients to imaging device 122.

Use data may take many forms. As shown in FIG. 4, use data 410 may be implemented as a count of how many times each allowed value of each feature supported by imaging device 122 was used in processing an electronic document. In another embodiment (not depicted), use data 410 may be implemented by indicating, for each allowable value for each feature supported by imaging device 122, a ratio of (a) those identified process requests that contain custom job data that identifies the allowed value for the feature to (b) those identified process requests that contain custom job data that identifies the feature. Use data 410 may be implemented using any format capable of expressing how imaging devices have processed electronic documents.

In an embodiment, whenever use data 410 indicates that a particular allowed value of a particular feature is more popular than the allowed value of the particular feature identified by the current configuration data 220, then imaging device 122 updates current configuration data 220 to identify the particular allowed value of the particular feature that is now most popular. For example, assume that imaging device 122 detects a particular process request communicated over network 102, imaging device 122 retrieves custom job data from the detected process request, and updates use data 410 as shown in FIG. 4. If current configuration data 220 currently identifies allowed value Y of the hole punch feature, then imaging device 122 will update current configuration data 220 so that it identifies value X of the hole punch feature, since value X of the hole punch feature is now the most popular allowed value for the hole punch feature. Any criteria may be used to determine the most popular value of a particular feature.

In an embodiment, imaging device 122 may delay the updating of current configuration data 220. To illustrate, imaging device 122 may wait for a configurable amount of time to expire after imaging device 122 detects that current configuration data 220 identifies a particular allowed value of a feature that is no longer the most popular allowed value for that feature before updating current configuration data 220. Alternately or additionally, imaging device 122 may wait to update current configuration data 220 until (a) a configurable number of changes need to be made to current configuration data 220 and/or (b) a configurable number of distinct process requests have been identified or received by imaging device 122. In this manner, the current configuration of imaging device 122 is prevented from changing rapidly over a short amount of time.

In an embodiment, after imaging device 122 updates the current configuration, imaging device 122 may cease to store any portion of use data 410 that reflects activity performed prior to when the current configuration was updated. In this manner, imaging device 122 may avoid storing large amounts of data.

In an embodiment, only certain features of the current configuration of an imaging device may be dynamically updated by performing the steps of FIG. 3. In such an embodiment, the current configuration with respect to some features supported by an imaging device may be updated by performing the steps of FIG. 3, while the current configuration with respect to other features may only be updated by an administrator. In other embodiments, any feature supported by an imaging device may be updated by the performance of the steps of FIG. 3.

Having describing how an embodiment updates the current configuration of an imaging device, extensions and alternatives involving secure communications shall now be presented.

Extensions and Alternatives Involving Secure Communications

In some embodiments, clients may issue process requests to imaging devices in a manner which imaging device 122 cannot directly observe, e.g., a security feature supported by IPV6 or another transmission protocol may be used in sending process requests to imaging devices, thereby preventing the process requests from being directly observed by imaging device 122. In such an embodiment, step 310 may be performed by imaging device 122 receiving a notification of a particular process request from another device on the network or imaging device 122 requesting such a notification from other imaging devices.

For example, in an embodiment, imaging device 120 may store a set of network addresses for imaging devices to which notification of one or more process requests received by imaging device 120 should be sent. When imaging device 120 receives a process request, imaging device 120 may issue a notification of the process request to each imaging device associated with a network address maintained by imaging device 120. In this way, imaging device 122 may receive notification, of a process request received at imaging device 120, from imaging device 120.

The notification identifies the custom job data associated with the process request associated with the notification. Imaging device 120 may issue a notification of a process request, received by imaging device 120, to imaging device 122 each time that imaging device 120 receives a process request, or imaging device 120 may wait a configurable interval before issuing a notification, so that a notification may identify multiple process requests.

In another embodiment, imaging device 122 may maintain a network address for other imaging devices on network 102, such as imaging device 120. After a predetermined interval, imaging device 122 may send a request, to each imaging device for which imaging device 122 maintains a network address, for use data that indicates how electronic documents were processed by the imaging device using features supported by the imaging device. Once imaging device 122 receives the use data from the imaging devices, imaging device 122 may update its current configuration to reflect the received use data. In this way, imaging device 122 may update its current configuration to reflect how electronic documents were processed by other imaging devices in an environment where communications exchanged between clients and imaging devices cannot be directly monitored.

Implementing Mechanisms

Figure 5:
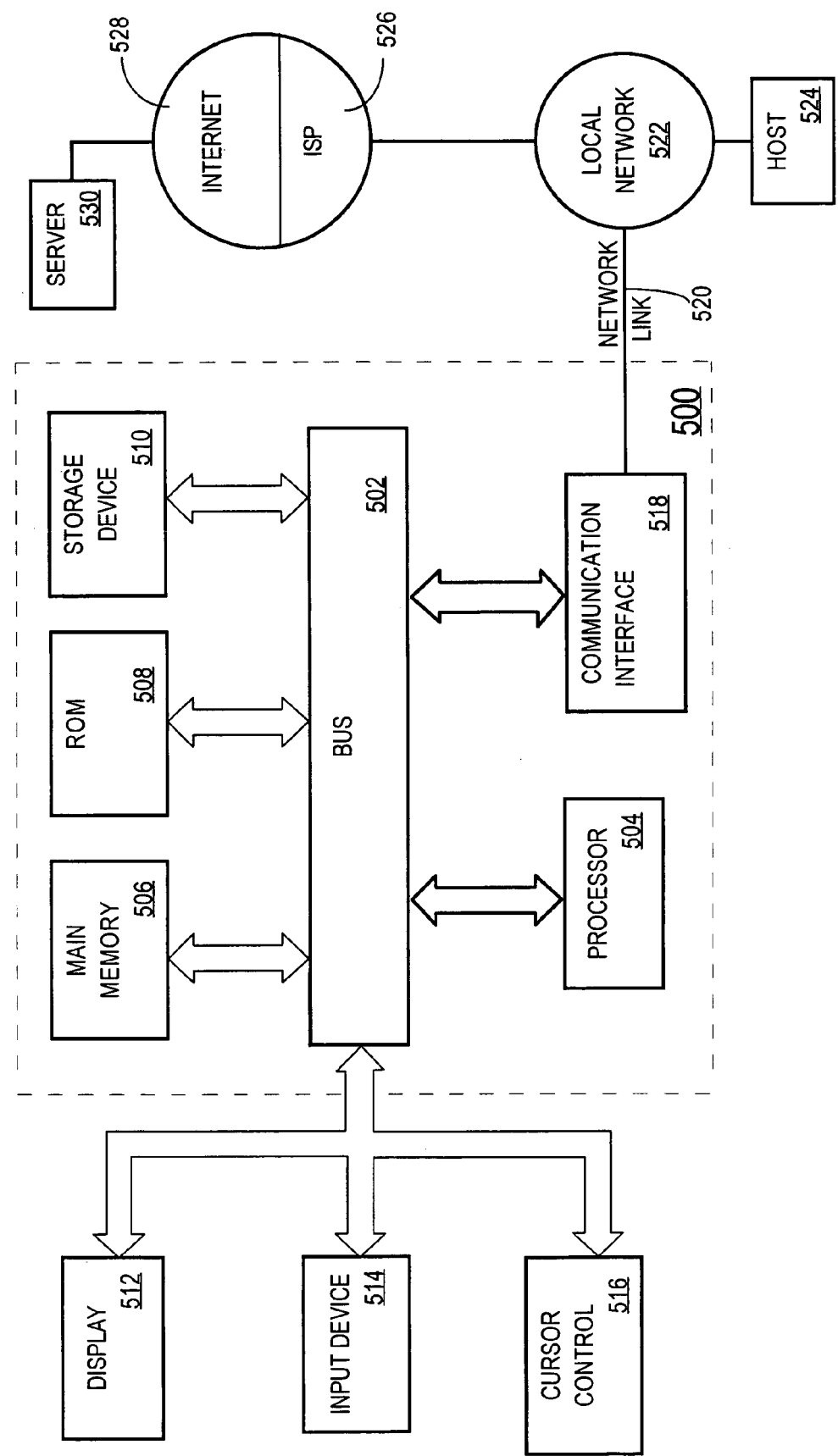
FIG. 5 is a block diagram that illustrates a computer system upon which an embodiment of the invention may be implemented.

In an embodiment, client 110 and imaging devices 120 and 122 may each be implemented on a computer system. FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for configuring an imaging device, comprising:
    at a first imaging device, monitoring communications exchanged between clients and other imaging devices over a network to identify requests to print electronic documents;
    the first imaging device detecting a particular request to print an electronic document, issued by a client to a second imaging device that is different than the first imaging device;
    in response to the first imaging device detecting the particular request to print the electronic document issued by the client to the second imaging device:
        the first imaging device determining one or more values of one or more features contained in the particular request to print the electronic document issued by the client to the second imaging device,
        the first imaging device updating a current configuration at the first imaging device for processing requests to print electronic documents at the first imaging device by updating, based upon the one or more values of the one or more features contained in the particular request to print the electronic document issued by the client to the second imaging device, one or more values of one or more features used to process requests to print electronic documents at the first imaging device, and
        the first imaging device using the updated one or more values of the one or more features to process one or more subsequent requests to print electronic documents at the first imaging device.

2. The method of claim 1, wherein monitoring communications comprises:
    the first imaging device storing data that identifies a set of identified imaging devices; and
    in response to the first imaging device detecting the particular request, the first imaging device determining if the second imaging device is in the set of identified imaging devices.

3. The method of claim 1, wherein monitoring communications comprises:
    the first imaging device storing data that identifies a set of identified imaging devices,
    wherein the composition of the set of identified imaging devices is based, at least in part, on a physical proximity of the set of identified imaging devices to the first imaging device.

4. The method of claim 1, wherein the first imaging device detects the particular request by monitoring communications over the network.

5. The method of claim 1, wherein the first imaging device detects the particular request by receiving a notification of the particular request from another device on the network.

6. The method of claim 1, wherein the first imaging device supports printing electronic documents according to a print feature, and wherein monitoring communications exchanged over the network comprises:
    the first imaging device storing statistics that describe how the imaging devices on the network print electronic documents using the print feature.

7. The method of claim 1, wherein the first imaging device supports printing electronic documents according to a print feature, and wherein monitoring communications exchanged over the network comprises:
    the first imaging device storing statistics that describe how the imaging devices on the network print electronic documents using the print feature,
    wherein the first imaging device updates the current configuration to reflect how the imaging devices on the network most often print electronic documents using the print feature.

8. The method of claim 1, wherein updating the current configuration is performed after an expiration of an amount of time since the first imaging device last updated the current configuration or a specified number of print requests have been detected by the first imaging device.

9. The method of claim 1, further comprising:
    after updating the current configuration, the first imaging device ceasing to store statistics, about how the imaging devices on the network printed electronic documents, which reflect activity preformed prior to when the current configuration was updated.

10. A method for configuring an imaging device, comprising:
    a first imaging device maintaining a network address for a second imaging device that is different than the first imaging device;
    after a specified interval, the first imaging device sending a request, to the second imaging device, for use data that indicates one or more values of one or more features supported by the second imaging device that were used to process electronic documents on the second imaging device;
    the first imaging device updating a current configuration of the first imaging device to reflect the use data that indicates the one or more values of one or more features supported by the second imaging device that were used to process electronic documents on the second imaging device; and
    the first imaging device using the updated current configuration of the first imaging device to process one or more requests to print electronic documents at the first imaging device.

11. A non-transitory machine-readable medium storing instructions for configuring an imaging device, wherein processing of the instructions by one or more processors causes:

at a first imaging device, monitoring communications exchanged between clients and other imaging devices over a network to identify requests to print electronic documents;

the first imaging device detecting a particular request to print an electronic document, issued by a client to a second imaging device that is different than the first imaging device;

in response to the first imaging device detecting the particular request to print the electronic document issued by the client to the second imaging device:

the first imaging device determining one or more values of one or more features contained in the particular request to print the electronic document issued by the client to the second imaging device, the first imaging device updating a current configuration at the first imaging device for processing requests to print electronic documents at the first imaging device by updating, based upon the one or more values of the one or more features contained in the particular request to print the electronic document issued by the client to the second imaging device, one or more values of one or more features used to process requests to print electronic documents at the first imaging device, and the first imaging device using the updated one or more values of the one or more features to process one or more subsequent requests to print electronic documents at the first imaging device.

12. A non-transitory machine-readable medium of claim 11, wherein monitoring communications comprises:

the first imaging device storing data that identifies a set of identified imaging devices; and in response to the first imaging device detecting the particular request, the first imaging device determining if the second imaging device is in the set of identified imaging devices.

13. A non-transitory machine-readable medium of claim 11, wherein monitoring communications comprises:

the first imaging device storing data that identifies a set of identified imaging devices, wherein the composition of the set of identified imaging devices is based, at least in part, on a physical proximity of the set of identified imaging devices to the first imaging device.

14. A non-transitory machine-readable medium of claim 11, wherein the first imaging device detects the particular request by monitoring communications over the network.

15. A non-transitory machine-readable medium of claim 11, wherein the first imaging device detects the particular request by receiving a notification of the particular request from another device on the network.

16. A non-transitory machine-readable medium of claim 11, wherein the first imaging device supports printing electronic documents according to a print feature, and wherein monitoring communications exchanged over the network comprises:

the first imaging device storing statistics that describe how the imaging devices on the network print electronic documents using the print feature.

17. A non-transitory machine-readable medium of claim 11, wherein the first imaging device supports printing electronic documents according to a print feature, and wherein monitoring communications exchanged over the network comprises:

the first imaging device storing statistics that describe how the imaging devices on the network print electronic documents using the print feature, wherein the first imaging device updates the current configuration to reflect how the imaging devices on the network most often print electronic documents using the print feature.

18. A non-transitory machine-readable medium of claim 11, wherein updating the current configuration is performed after an expiration of an amount of time since the first imaging device last updated the current configuration or a specified number of print requests have been detected by the first imaging device.

19. A non-transitory machine-readable medium of claim 11, wherein execution of the one or more sequences of instructions by one or more processors further causes:

after updating the current configuration, the first imaging device ceasing to store statistics, about how the imaging devices on the network printed electronic documents, which reflect activity preformed prior to when the current configuration was updated.

20. A non-transitory machine-readable medium storing instructions for configuring an imaging device, wherein processing of the instructions by one or more processors causes:

a first imaging device maintaining a network address for a second imaging device that is different than the first imaging device;

after a specified interval, the first imaging device sending a request, to the second imaging device, for use data that indicates one or more values of one or more features supported by the second imaging device that were used to process electronic documents on the second imaging device;

the first imaging device updating a current configuration of the first imaging device to reflect the use data that indicates the one or more values of one or more features supported by the second imaging device that were used to process electronic documents on the second imaging device; and the first imaging device using the updated current configuration of the first imaging device to process one or more requests to print electronic documents at the first imaging device.

21. An apparatus for configuring an imaging device, comprising:

one or more processors; and a memory storing one or more sequences of instructions for configuring the imaging device, wherein execution of the one or more sequences of instructions by the one or more processors causes:

at a first imaging device, monitoring communications exchanged between clients and other imaging devices over a network to identify requests to print electronic documents;

the first imaging device detecting a particular request to print an electronic document, issued by a client to a second imaging device that is different than the first imaging device;

in response to the first imaging device detecting the particular request to print the electronic document issued by the client to the second imaging device:

the first imaging device determining one or more values of one or more features contained in the particular request to print the electronic document issued by the client to the second imaging device, the first imaging device updating a current configuration at the first imaging device for processing requests to print electronic documents at the first imaging device by updating, based upon the one or more values of the one or more features contained in the particular request to print the electronic document issued by the client to the second imaging device, one or more values of one or more features used to process requests to print electronic documents at the first imaging device, and the first imaging device using the updated one or more values of the one or more features to process one or more subsequent requests to print electronic documents at the first imaging device.

22. The apparatus of claim 21, wherein monitoring communications comprises:

the first imaging device storing data that identifies a set of identified imaging devices; and in response to the first imaging device detecting the particular request, the first imaging device determining if the second imaging device is in the set of identified imaging devices.

23. The apparatus of claim 21, wherein monitoring communications comprises:

the first imaging device storing data that identifies a set of identified imaging devices, wherein the composition of the set of identified imaging devices is based, at least in part, on a physical proximity of the set of identified imaging devices to the first imaging device.

24. The apparatus of claim 21, wherein the first imaging device detects the particular request by monitoring communications over the network.

25. The apparatus of claim 21, wherein the first imaging device detects the particular request by receiving a notification of the particular request from another device on the network.

26. The apparatus of claim 21, wherein the first imaging device supports printing electronic documents according to a print feature, and wherein monitoring communications exchanged over the network comprises:

the first imaging device storing statistics that describe how the imaging devices on the network print electronic documents using the print feature.

27. The apparatus of claim 21, wherein the first imaging device supports printing electronic documents according to a print feature, and wherein monitoring communications exchanged over the network comprises:

the first imaging device storing statistics that describe how the imaging devices on the network print electronic documents using the print feature, wherein the first imaging device updates the current configuration to reflect how the imaging devices on the network most often print electronic documents using the print feature.

28. The apparatus of claim 21, wherein updating the current configuration is performed after an expiration of an amount of time since the first imaging device last updated the current configuration or a specified number of print requests have been detected by the first imaging device.

29. The apparatus of claim 21, wherein execution of the one or more sequences of instructions by the one or more processors further causes:

after updating the current configuration, the first imaging device ceasing to store statistics, about how the imaging devices on the network printed electronic documents, which reflect activity preformed prior to when the current configuration was updated.

30. An apparatus for configuring an imaging device, comprising:

one or more processors; and a memory storing instructions for configuring the imaging device, wherein processing of the instructions by the one or more processors causes:

a first imaging device maintaining a network address for a second imaging device that is different than the first imaging device;

after a specified interval, the first imaging device sending a request, to the second imaging device, for use data that indicates one or more values of one or more features supported by the second imaging device that were used to process electronic documents on the second imaging device;

the first imaging device updating a current configuration of the first imaging device to reflect the use data that indicates the one or more values of one or more features supported by the second imaging device that were used to process electronic documents on the second imaging device; and the first imaging device using the updated current configuration of the first imaging device to process one or more requests to print electronic documents at the first imaging device.

* * * * *